United States Patent
Nielson

[11] Patent Number: 5,852,792
[45] Date of Patent: Dec. 22, 1998

[54] SPACECRAFT BORESIGHT CALIBRATION FILTER

[75] Inventor: Marlin Craig Nielson, Boulder, Colo.

[73] Assignee: Lockheed Martin Corporation, Bethesda, Md.

[21] Appl. No.: 725,433

[22] Filed: Oct. 3, 1996

[51] Int. Cl.[6] ................................................ G06G 7/78
[52] U.S. Cl. .................... 701/222; 701/207; 244/165; 244/164; 250/251; 250/397
[58] Field of Search .................... 701/207, 221, 701/226, 222, 224, 214, 220; 342/357, 413, 359, 356; 244/164, 171, 165, 166; 250/251, 397, 491.1, 203.6; 73/178 R; 340/988, 990, 995

[56] References Cited

U.S. PATENT DOCUMENTS

| | | | |
|---|---|---|---|
| 4,679,753 | 7/1987 | Landecker | 244/171 |
| 4,746,976 | 5/1988 | Kamel et al. | 701/222 |
| 4,823,134 | 4/1989 | James et al. | 342/359 |
| 4,884,771 | 12/1989 | Scheit et al. | 244/165 |
| 4,896,032 | 1/1990 | Ball et al. | 250/251 |
| 4,944,587 | 7/1990 | Harigae | 356/152 |
| 4,988,189 | 1/1991 | Kroupa et al. | 701/225 |
| 5,051,751 | 9/1991 | Gray | 342/107 |
| 5,107,434 | 4/1992 | Paluszek | 701/222 |
| 5,177,686 | 1/1993 | Böinghoff et al. | 364/459 |
| 5,184,790 | 2/1993 | Fowell | 244/165 |
| 5,204,818 | 4/1993 | Landecker et al. | 701/226 |
| 5,259,577 | 11/1993 | Achkar et al. | 244/164 |
| 5,412,574 | 5/1995 | Bender et al. | 244/164 |

*Primary Examiner*—Jacques H. Louis-Jacques
*Attorney, Agent, or Firm*—Lane, Aitken & McCann; Carl M. Wright

[57] ABSTRACT

Concurrent determinations of errors for application of corrections to sensor data signals from an orbiting space vehicle to reduce or to eliminate the three components of boresight error. To locate more accurately the geographical position of targets detected by the sensors of an orbiting satellite, the pitch, roll, and yaw boresight errors caused by distortions or misalignments in the focal plane of the sensors are compensated for by comparing known position coordinates of an object (such as a star) to the observed position coordinates. The known position coordinates are converted to sensor coordinates by a series of intermediate coordinate conversions, essentially from the celestial frame of reference to an earth-centered frame of reference to a satellite attitude frame of reference to the satellite frame of reference to the sensor frame of reference. The corrections are applied frequently enough to take into account the change of the satellite's position relative to the sun to compensate for the thermal effects, inter alia, causing the boresight error. An optimal estimator increases the accuracy of the results.

14 Claims, 7 Drawing Sheets

SPACECRAFT BORESIGHT CALIBRATION FILTER

GOVERNMENT RIGHTS IN THE INVENTION

The United States Government has rights in this invention pursuant to Contract No. F05603-90-C-0002 with the Air Force.

DOCUMENTS INCORPORATED BY REFERENCE

U.S. Pat. No. 5,051,751 is incorporated by reference to show other types of Cartesian transformation matrices and uses of Kalman filtering.

U.S. Pat. No. 4,823,134 is incorporated by reference to show the implementation of a Kalman filter.

BACKGROUND AND SUMMARY OF THE INVENTION

This invention relates generally to correction of satellite observation data. It pertains particularly to correcting errors caused by inaccuracies in the focal plane of the satellite's sensors caused by, inter alia, thermal distortion of the focal plane, employing an optimal estimator, e.g., a Kalman Filter, to estimate the boresight state from the centroid of measurement of known images.

To record geodetic survey information, it is necessary that the observation data from observation satellites be as accurate and as precise as possible. Observation data from satellite sensors include errors from several sources. The data is transformed through several frames of reference, some of which rotate with respect to time. Time dependent varying errors in one frame of reference are imposed by static errors in another frame of reference which cannot be corrected by static correction in another coordinate frame of reference.

One error source is boresight irregularities caused by inaccuracies in the focal plane, e.g., distortion due to thermal changes as the satellite's aspect relative to the sun changes. The thermal distortion causes the boresight errors to change with respect to time. The boresight error has three components, measured in angular values—pitch, roll, and yaw. Pitch is rotation about the y-axis. Roll is rotation about the x-axis. Yaw is rotation about the z-axis.

Thermal distortion can be at least partially compensated for using thermal control. This approach is expensive and complicated but does not correct for all the temperature-caused errors.

The prior art discloses several methods for maintaining a satellite in its correct attitude and position. In this description, it is assumed that the satellite is correctly oriented according to attitude and location. The following prior art disclosures are directed to corrections in satellite attitude or to errors caused by incorrect attitude or position.

U.S. Pat. No. 5,051,751 shows the use of Kalman filtering for estimating the position and velocity of a tracked object. A line-of-sight to a moving object (target) is measured and transformed to a derived measurement Cartesian frame of reference having one axis pointing at an estimated target position. A Kalman filter, initially set by position and velocity error states, is updated with transformed sensor measurements to estimate the target's position and velocity.

U.S. Pat. No. 5,184,790 is directed to correction of satellite attitude errors caused by deviations in the inclination of the satellite orbit from its normal orbit plane. Although the error can be determined from observations of known points, e.g., a star, the corrections for boresight errors are not addressed or disclosed.

U.S. Pat. No. 4,823,134 focuses on problems of accurately directing a shipboard-mounted antenna toward a satellite, for example. Errors are caused by motion of the ship, anomalies in the antenna structure, and distortion in the deck shape caused by temperature changes. It discloses the use of a Kalman filter to correct static and time-varying errors to compensate for errors in several of the coordinate frames of reference which the data traverses. Actual point direction is determined by comparison to a reference which is not a known point but a corrected line-of-sight relative to the ship's frame of reference.

U.S. Pat. No. 5,107,434 is directed to controlling the attitude of a satellite. A polar star sensor with a line of sight parallel to the pitch axis of a geosynchronous orbiting satellite is employed for a two-axis location relative to the pitch axis. An earth sensor is also employed to find the satellite pitch about the pitch axis. The result from processing the polar star data and the data from the earth sensor is used to control torquers to maintain the proper satellite attitude.

U.S. Pat. No. 4,896,032 employs a two-wavelength beam pointer system compensator. Boresight alignment drift is measured and then used for beam pointing compensation. It is necessary to generate a beam and requires distance measuring.

U.S. Pat. No. 4,884,771 is directed to the calibration of attitude control gyroscopes of a satellite. It solves the problem of determining gyroscopic drift after the gyroscopes have drifted an unknown amount. In such a case, apogee insertion (firing of thrusters during the transfer phase of a geosynchronous earth satellite) will include unacceptable directional errors. A single two-axis sensor observes a radiating reference object, e.g., the sun or a star. Calibration is performed in two stages. In the first stage, a first reference attitude command signal is transmitted to the satellite and the sensor output signals are recorded at the beginning and at the end of the first stage time period. The second stage is similar but with a different attitude command signal being given. The time integrals of the gyroscope output signals produced during the first and second calibration stages (time intervals) can be used to find the gyroscopic drift as described in the patent.

U.S. Pat. No. 5,177,686 discloses a method of locating stars to be observed for determining the location of a spacecraft where it cannot be predicted which stars will appear in the visual field of the sensors. It selects patterns of stars expected to be in the visual field and matches them to stored templates to determine which stars are being observed in the field.

U.S. Pat. No. 4,944,587 is directed to detecting attitude information of a spacecraft by comparing star image signals such as brightness and position with stored information for generating an attitude signal substantially corresponding to the orientation of the sensors.

U.S. Pat. No. 5,259,577 relates to roll and yaw control of a satellite employing kinetic moments. It senses the attitude of the satellite using a terrestrial sensor and a star sensor for locating Polaris (the North Star).

The prior art systems, while useful for the purposes for which they were designed, do not suggest boresight error corrections. The use of optimal estimators such as Kalman Filters is mainly applied to correcting satellite attitude errors.

In the invention being disclosed, corrections for boresight errors are determined by ascertaining the position, i.e., on which specific sensing element of a sensor array its image should appear, of a known spatial point, e.g., a star or known earth location. The actual location of the spatial point, i.e., the specific sensor on which its image actually appears, is compared to the predicted location to provide data for error estimation and corrections to be applied to the observations from the satellite. The errors are processed through an optimizing filter, typically a Kalman Filter, to improve the error estimates.

In accordance with the invention, the known position coordinates of an object which can be sensed are supplied in earth-centered coordinates which are converted into coordinates in a sensor frame of reference via a series of intermediate (mesne) conversions in other coordinate systems. The observed position coordinates of the known object, averaged to determine the centroid of measurement to select the data to be processed, are compared with the known position coordinates to determine concurrently the roll, pitch, and yaw errors. The errors thus determined are processed by an optimal estimator and applied as corrections to satellite mission observation data.

The specific utility of the invention is to make concurrent corrections to satellite survey input data to compensate for boresight errors. This is accomplished by observing a known target and transforming its coordinates to the same frame of reference as the raw input data. The difference between the observed target vector and the known target vector is applied to an optimal estimator, implemented as a Kalman Filter, to calculate the boresight state vector. The latter is then used to correct raw mission data for the boresight errors.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

Summary of Abbreviations and Symbology $\epsilon$—elevation angle
$\alpha$—azimuth angle
$\gamma_z = \theta_z + \psi_z$
ARF—attitude frame of reference
ECF—earth-centered frame of reference
ID—source identifier
IR—infrared (sensors)
IRF—infrared (sensor) frame of reference
LOS—line of sight
NID(0,$\sigma$)—normally and independently distributed with mean of zero and standard deviation of $\sigma$, i.e., random
$\theta_y, \theta_x, \theta_z$—boresight state variables, viz., boresight pitch, roll, and yaw
$\dot{\theta}_y, \dot{\theta}_x, \dot{\theta}_z$—boresight state velocity variables representing, respectively, $$\frac{d\theta_y}{dt}, \frac{d\theta_x}{dt}, \frac{d\theta_z}{dt}.$$

(See augmented boresight state matrix.)
RRF—Representative Return Formation
SCM—satellite center of mass
SRF—satellite frame of reference
$\vec{i}, \vec{j}, \vec{k}$—unit vectors along the x-, y-, z-axes, respectively, of a right-handed three-dimensional vector coordinate system
$\vec{v}$—general notation denoting a vector where the components are normally expressed as a sum of scalar values times each of the unit vectors
[ ]—encloses a matrix when it is not expressed in full matrix form nor identified as a matrix $$\dot{x}(t) - \left.\frac{dx}{dt}\right]_t$$

$$\ddot{x}(t) - \left.\frac{d^2x}{dt^2}\right]_t$$

$E\{m\}$—expected value of m, usually the mean

General Overview

The following description discloses a calibration filter for an infrared (IR) sensor array aboard a surveillance satellite. The calibration output from the filter is termed a boresight and comprises three Euler angle rotations that are applied to three-dimensional line-of-sight (LOS) vectors.

The boresight calibration filter calculations involve four coordinate frames of reference, each of which is based on a system of three mutually perpendicular dextral axes, x, y, and z. Unit vectors along the x-, y-, and z-axes are designated $\vec{i}, \vec{j}$, and $\vec{k}$, respectively.

One coordinate frame of reference is the IR (sensor) reference frame (IRF). The IRF is referenced to the focal plane in which the sensors are arranged and upon which a surveillance telescope is focussed.

A second frame of reference is the satellite frame of reference (SRF). The sensor array focal plane is in the x–y plane of the SRF and the z-axis of the SRF is parallel to the line-of-sight (LOS) of the satellite's telescope, usually directed toward the earth's center.

A third frame of reference is the satellite attitude frame of reference (ARF) and the fourth is the earth-centered frame of reference (ECF) which is considered fixed.

Each of these frames of reference will now be discussed in more detail.

The IRF

Figure 1:
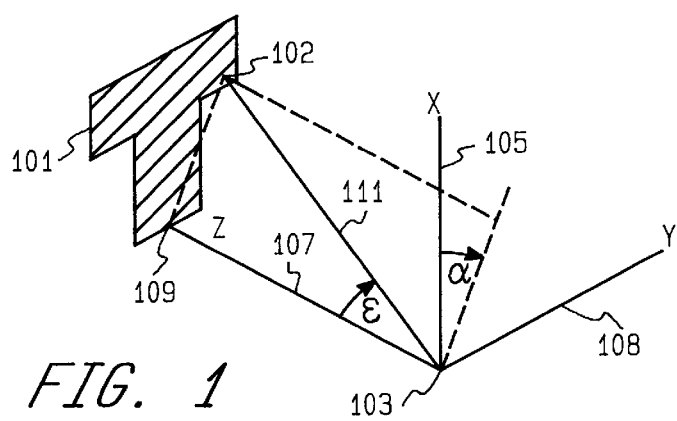
FIG. 1 is a diagram of the sensor frame of reference (IRF) orientation.

The IRF is referenced to the satellite's center of mass (SCM) 103 as illustrated in FIG. 1. The T-shaped element 101 represents the sensor focal plane which contains a plurality of sensors, infrared sensors in this description. This description contemplates that the sensors provide a scan of the earth once per rotation of the satellite. The orientation of this focal plane with respect to the satellite is the subject of the calibration filter. The x-axis 105 is parallel to the center line of the focal plane 101 and the z-axis 107 intersects the bottom center point 109 of the focal plane 101. The focal plane 101 rotates about the point 109 while the IRF rotates about the z-axis. The y-axis 109 is perpendicular to the x- and z-axes. The nominal location of each of the sensing elements is specified by azimuth, angle $\alpha$, and elevation, angle $\epsilon$. In the IRF, the azimuth is designated $\alpha_{irf}$ and the elevation, $\epsilon_{irf}$. Each sensor in the focal plane 101 is uniquely identified by a LOS such as the vector 111 to one of the sensors 102 as shown.

Unit vectors to the sensors are given according to $$\vec{u}_{irf} = x_{irf}\vec{i}_{irf} + y_{irf}\vec{j}_{irf} + z_{irf}\vec{k}_{irf}$$

where $$x_{irf} = \cos(\alpha_{irf})\sin(\epsilon_{irf}), \quad (1a)$$

$$y_{irf} = \sin(\alpha_{irf})\sin(\epsilon_{irf}), \quad (1b)$$

and $$z_{irf} = \cos(\epsilon_{irf}), \quad (1c)$$

since $\sqrt{x_{irf}^2 + y_{irf}^2 + z_{irf}^2} = 1$ with $$\alpha_{irf} = \tan^{-1}\left(\frac{y_{irf}}{x_{irf}}\right) \text{ and } \epsilon_{irf} = \cos^{-1}(z_{irf}).$$

The SRF

Figure 2:
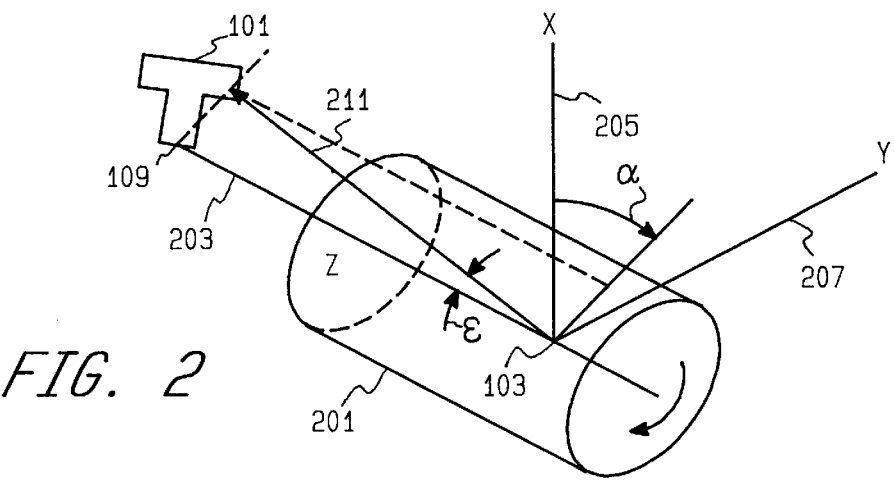
FIG. 2 is a diagram of the satellite frame of reference (SRF) orientation.

The SRF is illustrated in FIG. 2. It is also centered at the SCM 103. The satellite 201 rotates right-handedly about the z-axis 203. The x-axis 205 is perpendicular to the LOS of the scanning telescope. The y-axis 207 is mutually perpendicular to the x- and z-axes. The azimuth and elevation angles are shown but not used in the SRF which is an intermediate (mesne) frame of reference for converting between the IRF and the ARF. The focal plane 101 is shown as it nominally relates to the z-axis 203 of the satellite.

The ARF and ECF

Figure 3:
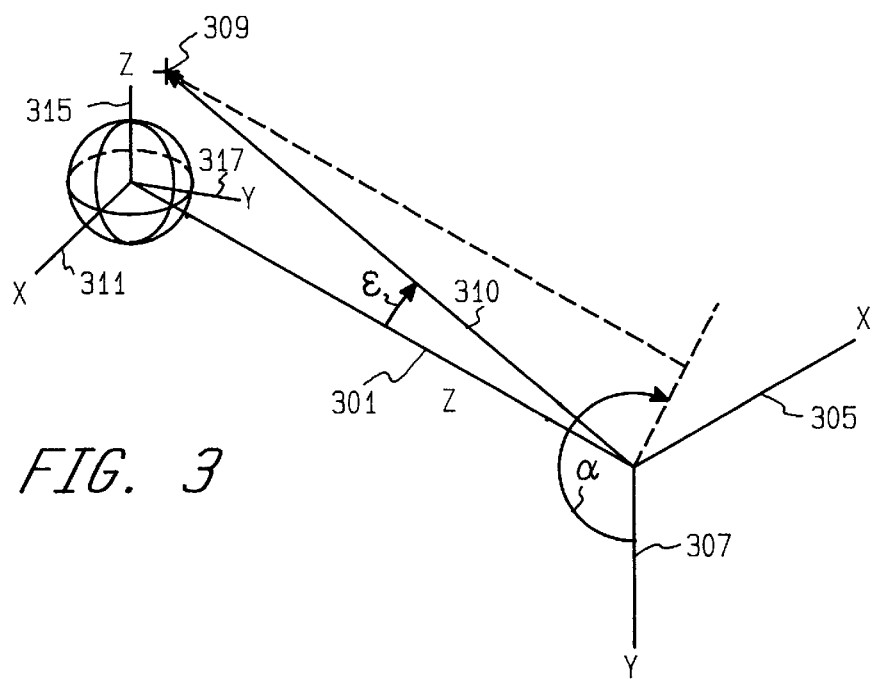
FIG. 3 is a diagram of the attitude frame of reference (ARF) orientation with the earth-centered frame of reference (ECF) orientation showing their relationship to one another.

The ARF and ECF are illustrated in FIG. 3 to show their relationship to one another. That is, the ARF orientation is derived from the ECF. The ARF z-axis 301 points to the center of the earth 303, i.e., to the origin of the ECF. The ARF x-axis 305 is directed parallel to the earth's easterly direction. The y-axis 307 is mutually perpendicular to the x- and z-axes. A unit vector 310 to a known target, e.g., a star 309, within the field of view of the satellite having an azimuth aarf and an elevation earf is given as $$\vec{u}_{arf} = x_{arf}\vec{i}_{arf} + y_{arf}\vec{j}_{arf} + z_{arf}\vec{k}_{arf}$$

where $$x_{arf} = -\sin(\alpha_{arf})\sin(\epsilon_{arf}), \text{tm (2a)}$$

$$y_{arf} = \cos(\alpha_{arf})\sin(\epsilon_{arf}), \quad (2b)$$

and $$z_{arf} = \cos(\epsilon_{arf}) \quad (2c)$$

since $\sqrt{x_{arf}^2 + y_{arf}^2 + z_{arf}^2} = 1$ with $$\alpha_{arf} = \tan^{-1}\left(\frac{-x_{arf}}{y_{arf}}\right)$$

and $\epsilon_{arf} = \cos^{-1}(z_{arf})$.

The ECF is considered the fixed frame of reference in this description and is the base reference frame for all the calibration measurement sources. The measurement sources include earth sources and celestial sources. The earth sources are known locations on or near the surface of the earth expressed in geodetic latitude, longitude, and altitude. The celestial sources are typically stars located by geocentric latitude, longitude, and time. Ephemerides are a tabulation of star locations relative to time. The ephemerides take into account the earth's rotation and orbit, proper motion, precession, nutation, and diurnal aberration.

The ECF x-axis 311 is oriented from the ECF origin at the center of the earth through the crossing of the Greenwich meridian at the equator, i.e., latitude 0° and longitude 0°. The z-axis 315 is oriented through the north pole, i.e., latitude 90° and longitude indeterminate. The y-axis 317 is mutually perpendicular to the x-and z-axes,i.e., latitude 0° and longitude 90° East. The ECF axes therefore rotate with the earth. Unit vectors to all ground sources are computed from geodetic latitude and longitude.

The filter calculations depend on the capability to express vectors in each of the frames of reference transforming between frames of reference for rotation purposes only.

Figure 4:
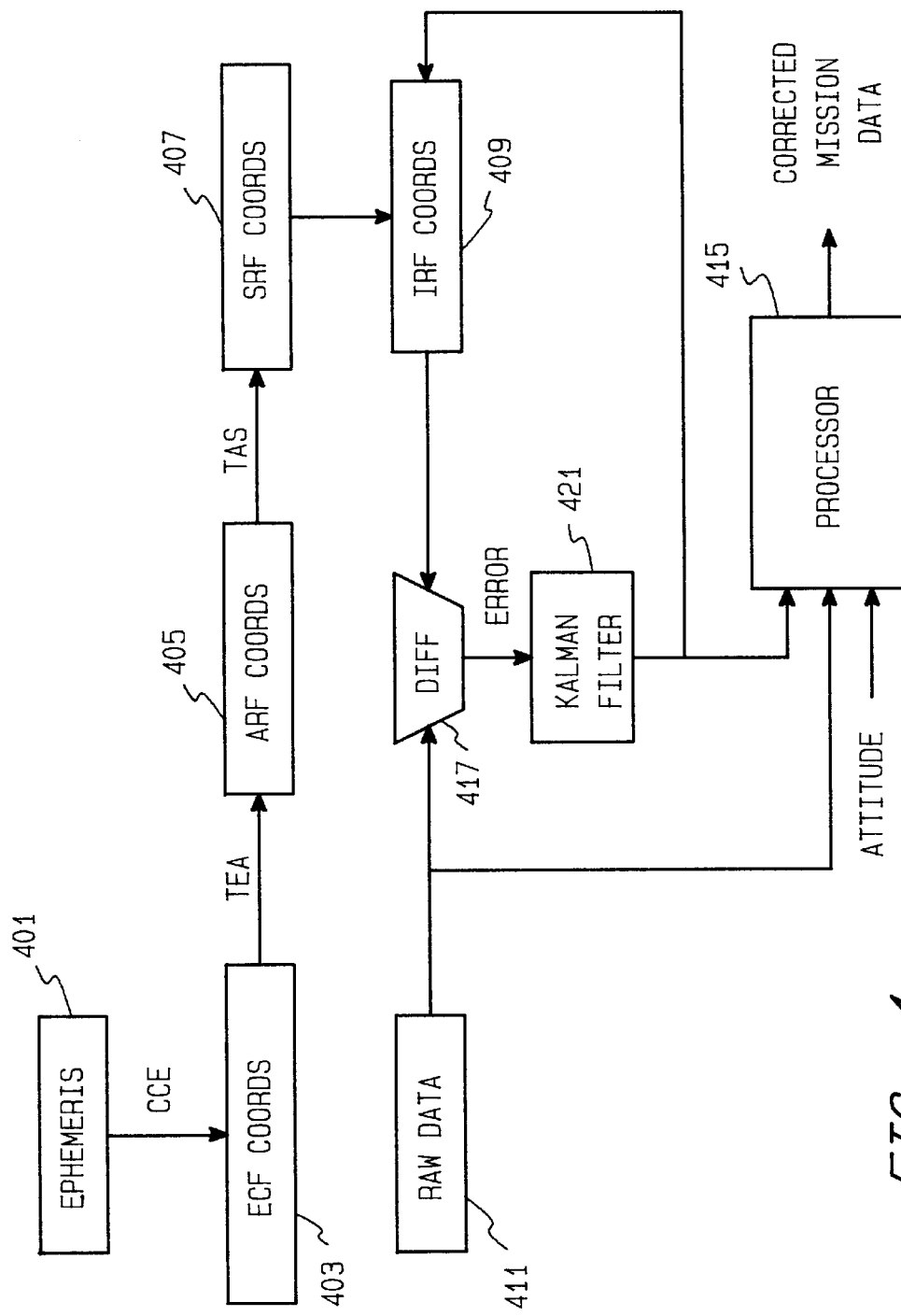
FIG. 4 is a block diagram of a boresight calibration apparatus.

FIG. 4 is a block diagram of an implementation of the invention. The Right Ascension (RA) and declination (dec) of one or more stars in an ephemeris 401 are converted by a CCE (conversion from celestial parameters to ECF) process. The ECF coordinates 403 are transformed to ARF coordinates 405 by a transformation process TEA, described below as a transformation matrix $T_{erf \to arf}$.

The ARF coordinates 405 are transformed to SRF coordinates 407 by a transformation process TAS, described below as a transformation matrix $T_{arf \to srf}$. The SRF coordinates 407 are transformed to IRF coordinates 409 by a transformation process TSI, described below as a transformation matrix $T_{srf \to irf}$.

Data returns 411 of a known object from a geodetic survey satellite are processed to generate boresight data in the IRF which are applied to one input of a difference (comparator) unit 417, the other input signals being the IRF coordinates 409 of the predicted location of the image. The output signals from the difference unit 417 are errors which are supplied as input data to a Kalman Filter 421. The Kalman Filter updates the boresight's state vector with terms $\theta_y$, $\theta_x$, and $\theta_z$ (pitch, roll, and yaw, respectively).

The boresight state vector and the attitude state vector, $P_A$, $R_A$, and $Y_A$, are applied as input signals to a processor 415. The raw data returns representing mission data are processed by the processor 415 to supply mission data corrected for boresight errors.

Figure 5:
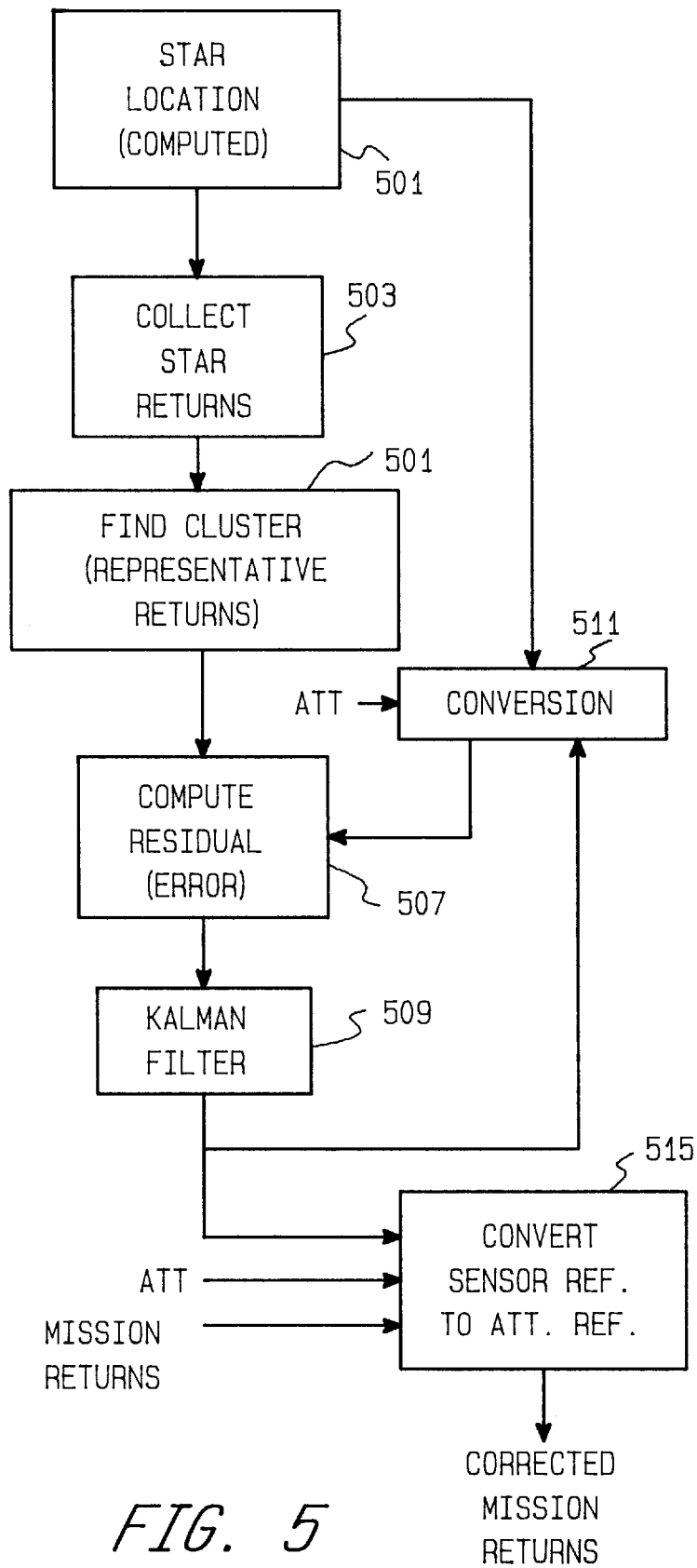
FIG. 5 is a process flowchart of the boresight calibration.

In FIG. 5, the position coordinates of a known object to be observed, e.g., a star within the observation field of the satellite telescope, are supplied. The coordinates can be computed or can be taken from stored catalog of coordinates as represented by a process block 501. The coordinates are typically updated every 30 seconds from a list of candidates for the observation.

The star returns are collected, block 503, but the image of the target is not necessarily confined to a single sensor. The sensor image overlaps several of the sensor elements, producing a blurred image. That is, the star return data forms a cluster of images on the sensor array. To obtain an accurate position of the image of the known object, the returns are averaged to determine a centroid of measurement, block 505. The Representative Return Formation determines a centroid of measurement of the image, effectively cleaning up the input data and providing performance measure. The Kalman Filter optimizes the measurement by predicting the centroid of the image based on present measurements and the current state.

The representative returns are in terms of an augmented averaged azimuth and elevation. For greater accuracy averaging, the $\epsilon$ values are weighted as explained below according to intensity. The returns are used for performance measure and to collect raw data for an optimal estimator.

The output values (raw returns) from the process block 505 are supplied one at a time to a residual computation 507 that compares and supplies the error between the measured data and the known data of the known object prediction. The known data, supplied by the ephemeris 501 is converted from a celestial or earth coordinate frame of reference to the sensor frame of reference by mesne conversions 511. The other input information to the conversion process 511 include the satellite attitude state, i.e., the pitch, roll, and yaw terms of the satellite attitude, and the boresight state, i.e., the boresight pitch, roll, and yaw from an optimal estimator 509.

The optimal estimator 509 is preferably implemented as a Kalman Filter because the latter accepts multiple input data and supplies multiple output state data. The input to the optimal estimator 509 are the error data from the residual (error) computations 507. An optimal multivariable estimator, such as a Kalman Filter, basically employs iterative process for optimizing linear measurement estimates.

The discrete process equation for a Kalman is usually portrayed as $$[x(n+1)] = [\Phi][x(n)] + [\Gamma][u(n)] + [\Gamma_1][w(n)]$$

with measurement $[y(n)] = [H][x(n)] + [v(n)]$
where
[x]=state vector,
[u]=control vector,
[w]=process noise NID(0,σ),
[v]=measurement noise NID(0,σ),
[Φ]=discrete system matrix,
[Γ]=discrete control input matrix,
[Γ₁]=discrete process noise, and
[H]=continuous output matrix.

The basic ideas of a Kalman Filter are that it combines previous estimates with the current measurement, and it uses the history of data as $$[\bar{x}(n)] = [\Phi][\hat{x}(n-1)] + [\Gamma][u(n-1)]$$

In the present application, the output from the Kalman Filter, i.e., the x state vector, is the boresight state, $\theta_y$, $\theta_x$, and $\theta_z$. The significance of the states are explained in more detail below.

The refined boresight state data is then used to correct mission returns, i.e., the observation data which the satellite was intended to collect. The corrected mission returns are computed from the raw data returns, the boresight state vector from the optimal estimator 509, and the converted satellite attitude vector. The corrected mission returns are converted from the sensor frame of reference to the attitude frame of reference in the correction process 515.

The details of the conversions (or transformations) among the different frames of reference are described next.

Transformation from ECF to ARF coordinates

The ECF to ARF transformation is accomplished by defining a set of unit vectors in the ECF that are parallel to the corresponding ARF axes. The vector $\vec{R}_s$ (with magnitude $r_s$) is an ECF radius vector to the SCM with coefficients a, b, and c. These are known values since they represent the position of the satellite with respect to the ECF coordinates. The value of $r_s$ is $\sqrt{a^2+b^2+c^2}$. A magnitude $r_{xy}$ is $|R_{s,xy}|$ and equal to $\sqrt{a^2+b^2}$, that is, the magnitude of the x and y ECF components of the $R_s$ vector. The quantities $r_s$ and $r_{xy}$ are scalars.

The transformed components are, therefore, $$\vec{k}_{arf} = -\frac{\vec{R}_s}{|\vec{R}_s|} = -\frac{a\vec{i}_{ecf} + b\vec{j}_{ecf} + c\vec{k}_{ecf}}{r_s},$$

$$\vec{i}_{arf} = \frac{\vec{k}_{arf} \times \vec{k}_{ecf}}{|\vec{k}_{arf} \times \vec{k}_{ecf}|} = \frac{-b\vec{i}_{ecf} + a\vec{j}_{ecf}}{r_{xy}}, \text{ and}$$

$$\vec{j}_{arf} = \frac{\vec{k}_{arf} \times \vec{i}_{arf}}{|\vec{k}_{arf} \times \vec{i}_{arf}|} = \frac{-ac\vec{i}_{ecf} + bc\vec{j}_{ecf} - (a^2+b^2)\vec{k}_{ecf}}{r_s \times r_{xy}}.$$

The ECF coordinates in the ARF are the vector dot products of each of the basis unit vectors. To convert a vector in the ECF to a vector in the ARF, The unit vector $\vec{v}_{erf}$ is found as illustrated in equation (2). The transform matrix is denoted $T_{ecf \to arf}$.

$$\vec{v}_{arf} = \begin{bmatrix} \vec{i}_{arf} \cdot \vec{v}_{ecf} \\ \vec{j}_{arf} \cdot \vec{v}_{ecf} \\ \vec{k}_{arf} \cdot \vec{v}_{ecf} \end{bmatrix} = \begin{bmatrix} -\frac{b}{r_{xy}} & \frac{a}{r_{xy}} & 0 \\ \frac{ac}{r_s \times r_{xy}} & \frac{bc}{r_s \times r_{xy}} & \frac{-(a^2+b^2)}{r_s \times r_{xy}} \\ -\frac{a}{r_s} & -\frac{b}{r_s} & -\frac{c}{r_s} \end{bmatrix} \vec{v}_{ecf}.$$

To transform a vector from the ECF to the ARF, the inverse of $T_{ecf \to tarf}$ can be used. ($T_{ecf \to arf}$ is orthogonal so its inverse is equal to its transpose.) Therefore, $T_{arf \to ecf} = T^T_{ecf \to arf}$.

Transformation from ARF to SRF coordinates

Successive rotations about the pitch (ARF y), the roll (ARF x), and the yaw (ARF z) axes are used to transform from the ARF to the SRF. These rotational transforms are denoted as $\Psi_y$, $\Psi_x$, and $\Psi_z$, respectively, and use the pitch angle $\psi_y$, the roll angle $\psi_x$, and the yaw angle $\psi_z$:

$$\Psi_y = \begin{bmatrix} \cos\psi_y & 0 & -\sin\psi_y \\ 0 & 1 & 0 \\ \sin\psi_y & 0 & \cos\psi_y \end{bmatrix},$$

$$\Psi_x = \begin{bmatrix} 1 & 0 & 0 \\ 0 & \cos\psi_x & \sin\psi_x \\ 0 & -\sin\psi_x & \cos\psi_x \end{bmatrix},$$

and $$\Psi_z = \begin{bmatrix} \cos\psi_z & \sin\psi_z & 0 \\ -\sin\psi_z & \cos\psi_z & 0 \\ 0 & 0 & 1 \end{bmatrix}.$$

The transform matrix is given by $T_{arf \to srf} = \Psi_z \Psi_x \Psi_y$. Transformation of a vector from the ARF to the SRF is, therefore, $$\vec{V}_{srf} = T_{arf \to srf} \vec{V}_{arf} = \Psi_z \Psi_x \Psi_y \vec{V}_{arf}.$$

The inverse matrix transforms SRF coordinates to ARF coordinates. The transformation matrix $T_{srf \to arf}$ is given by $\Psi^T_y \Psi^T_x \Psi^T_z$ since each of the $\Psi$ matrices are orthogonal and the order of multiplication is reversed.

Approximations for ARF to SRF transformations can be made for $\psi_y$ and $\psi_x$ when the angles are small, which is usually the case. The value of $\psi_z$ takes on angular measurements from 0 to $2\pi$ radians as the satellite rotates about the z-axis. The small angle transformation are simplified by taking a first order approximations of the sine and cosine functions (a value of 1 for the cosine function). The simplified result is $$T_{arf \to srf} \approx \begin{bmatrix} \cos\psi_z & \sin\psi_z & 0 \\ -\sin\psi_z & \cos\psi_z & 0 \\ 0 & 0 & 1 \end{bmatrix} \times \begin{bmatrix} 1 & 0 & 0 \\ 0 & 1 & \psi_x \\ 0 & -\psi_x & 1 \end{bmatrix} \times \begin{bmatrix} 1 & 0 & -\psi_y \\ 0 & 1 & 0 \\ \psi_y & 0 & 1 \end{bmatrix}.$$

Multiplying the matrices yields a simplified transformation matrix, $$T_{arf \to srf} \approx \begin{bmatrix} \cos\psi_z & \sin\psi_z & -\psi_y\cos\psi_z + \psi_x\sin\psi_z \\ -\sin\psi_z & \cos\psi_z & \psi_y\sin\psi_z + \psi_x\cos\psi_z \\ \psi_y & -\psi_x & 1 \end{bmatrix}.$$

Transformation from SRF to IRF Coordinates

Transformation from the satellite frame of reference to the sensor IR frame is accomplished by successive rotations about the yaw (SRF z), roll (SRF x), and pitch (SRF y) axes. These rotations are denoted by, $\Theta_z$, $\Theta_x$, and $\Theta_y$, respectively, using the yaw angle $\theta_z$, the roll angle $\theta_x$, and the pitch angle $\theta_z$, $$\Theta_z = \begin{bmatrix} \cos\theta_z & \sin\theta_z & 0 \\ -\sin\theta_z & \cos\theta_z & 0 \\ 0 & 0 & 1 \end{bmatrix},$$

$$\Theta_x = \begin{bmatrix} 1 & 0 & 0 \\ 0 & \cos\theta_x & \sin\theta_x \\ 0 & -\sin\theta_x & \cos\theta_x \end{bmatrix},$$

and $$\Theta_y = \begin{bmatrix} \cos\theta_y & 0 & -\sin\theta_y \\ 0 & 1 & 0 \\ \sin\theta_y & 0 & \cos\theta_y \end{bmatrix}.$$

The matrix product of the $\Theta$ transform matrices gives the SRF to IRF transformation matrix, $T_{srf \to irf} = \Theta_y \Theta_x \Theta_z$ so that a vector in the SRF is transformed to a vector in the IRF by $$\vec{V}_{irf} = T_{srf \to irf} \vec{V}_{srf} = \Theta_y \Theta_x \Theta_z \vec{V}_{srf}.$$

The inverse transformation matrix is $T_{irf \to srf} = \Theta^T_z \Theta^T_x \Theta^T_y$ since each rotation matrix $\Theta$ is orthogonal and the order of matrix multiplication is reversed.

As in the ARF to SRF transformation, the $\theta_y$ and $\theta_x$ angles are usually small while $\theta_z$ takes on a constant value between 0 and $2\pi$ with small variations around the constant value. Using a first order approximation for the sine and cosine functions, the small angle transform becomes $$T_{srf \to irf} \approx \begin{bmatrix} 1 & 0 & -\theta_y \\ 0 & 1 & 0 \\ \theta_y & 0 & 1 \end{bmatrix} \times \begin{bmatrix} 1 & 0 & 0 \\ 0 & 1 & \theta_x \\ 0 & -\theta_x & 1 \end{bmatrix} \times \begin{bmatrix} \cos\theta_z & \sin\theta_z & 0 \\ -\sin\theta_z & \cos\theta_z & 0 \\ 0 & 0 & 1 \end{bmatrix}.$$

Multiplying the matrices, $$T_{srf \to irf} \approx \begin{bmatrix} \cos\theta_z & \sin\theta_z & -\theta_y \\ -\sin\theta_z & \cos\theta_z & \theta_x \\ \theta_y\cos\theta_z + \theta_x\sin\theta_z & \theta_y\sin\theta_z - \theta_x\cos\theta_z & 1 \end{bmatrix}.$$

Composite ARF to IRF Small Angle Transformation

For faster and more efficient computation, a composite transformation matrix for small angles from the ARF directly to the IRF can be derived as $$T_{arf \to irf} = T_{srf \to irf} \times T_{arf \to srf} \approx \begin{bmatrix} \cos\theta_z & \sin\theta_z & -\theta_y \\ -\sin\theta_z & \cos\theta_z & \theta_x \\ ((\theta_y\cos\theta_z + \theta_x\sin\theta_z) & (\theta_y\sin\theta_z - \theta_x\cos\theta_z) & 1 \end{bmatrix} \times$$

$$\begin{bmatrix} \cos\psi_z & \sin\psi_z & \psi_x\sin\psi_z - \psi_y\cos\psi_z \\ -\sin\psi_z & \cos\psi_z & \psi_y\sin\psi_z + \psi_x\cos\psi_z \\ \psi_y & -\psi_x & 1 \end{bmatrix}.$$

Performing the matrix multiplication and using angle sum and difference formulae, the transformation matrix $$T_{arf \to irf} \approx \begin{bmatrix} \cos\gamma_z - \psi_y\theta_y & \sin\gamma_z + \psi_x\theta_y & -\psi_y\cos\gamma_z + \psi_x\sin\gamma_z - \theta_y \\ -\sin\gamma_z + \psi_y\theta_x & \cos\gamma_z - \psi_x\theta_x & \psi_y\sin\gamma_z + \psi_x\cos\gamma_z + \theta_x \\ \theta_y\cos\gamma_z + \theta_x\sin\gamma_z + \psi_y & \theta_y\sin\gamma_z - \theta_x\cos\gamma_z - \psi_x & (\theta_y(-\psi_y\cos\gamma_z + \psi_x\sin\gamma_z) \\ & & -\theta_x(\psi_y\sin\gamma_z + \psi_x\cos\gamma_z) + 1) \end{bmatrix}$$

where $\gamma_z = \theta_z + \psi_z$.

The application of the details to the embodiment of the invention are now described.

System Model

To accomplish the boresight calibration, the boresight pitch angle $\theta_y$, the boresight roll angle $\theta_x$, and the boresight yaw angle $\theta_z$ are determined. That is, the orientation of the IRF to the SRF is ascertained. These angles change on a diurnal basis and an annual basis, primarily due to thermal effects from the position of the sun on the satellite. Variance measurements using known diurnal boresight curves show that the variance increases according to the square of time up to several hours. Based on several measurements every ten seconds, the model chosen for the system is a double integrator for each state driven by Gaussian white noise $NID(0,\sigma)$. Only the output from the second integrator is filtered. The state definition is, therefore, $$x(t) = \begin{bmatrix} \theta_y \\ \theta_x \\ \theta_z \end{bmatrix}, \text{ the boresight pitch, roll, and yaw vector.}$$

The system model is then $\dot{x}(t) = [w(t)]$ with $x(t)_{t=0} = 0$.

The state transition matrix $\Phi(t)$ is found by solving the state equation and $\Phi(t) = I$ where $I$ is the identity matrix, i.e., all matrix elements are zero except for the main diagonal which is all ones.

The second order statistic (covariance equation) matrix is $\ddot{P}_{xx}(t) = [Q]$ so the mean squared value grows according to the time squared, i.e., $$E\{xx^T\} = [Q] \times \frac{(t - t_0)^2}{2}.$$

Measurement Model

The measurement model is a function of the state variables plus a random component of measurement noise or disturbance which is assumed to be Gaussian white noise with zero mean and covariance $[R]$. That is, $[z_k] = [h_k(x(t_k))] + [v_k]$. The measurement is $[z_k]$ at time $t_k$, and $[h_k]$ is a nonlinear function. $[V_k]$ is the measurement noise.

The measurements are provided by discrete sensor elements in the focal plane illuminated by stars and ground sources on earth. Each sensor element is identified by azimuth and elevation coordinates in the IRF. The nonlinear measurement function is obtained in the process of transforming star data from the ARF to the IRF. The measurement equations are $$\begin{bmatrix} x_{irf} \\ y_{irf} \\ z_{irf} \end{bmatrix} = T_{arf \to irf} \begin{bmatrix} x_{arf} \\ y_{arf} \\ z_{arf} \end{bmatrix}, \quad (3a)$$

$$\alpha_{irf} = \tan^{-1}\left(\frac{y_{irf}}{x_{irf}}\right), \text{ and} \quad (3b)$$

$$\epsilon_{irf} = \cos^{-1} z_{irf}. \quad (3c)$$

Since $T_{arf \to irf}$ contains the state variables, the given measurement equations is the nonlinear measurement function $[h_k(x(t_k))]$.

Observation Matrix

The Kalman filter requires a linear form of $[h_k(x(t_k))]$ to compute the Kalman gain equation and the covariance matrix update. Linearization is accomplished by taking the partial derivative of each of the measurement variables with respect to each of the state variables:

$$H_k = \begin{bmatrix} \frac{\partial \alpha_{irf}}{\partial \theta_y} & \frac{\partial \alpha_{irf}}{\partial \theta_x} & \frac{\partial \alpha_{irf}}{\partial \theta_z} \\ \frac{\partial \epsilon_{irf}}{\partial \theta_y} & \frac{\partial \epsilon_{irf}}{\partial \theta_x} & \frac{\partial \epsilon_{irf}}{\partial \theta_z} \end{bmatrix}.$$

The steps for taking the partial derivatives of $\alpha$ (omitting the subscripts) with respect to $\theta$ (also omitting the subscripts) are as follows:

$$\frac{\partial \alpha}{\partial \theta} = \frac{\partial \tan^{-1}\left(\frac{y}{x}\right)}{\partial \theta} = \frac{1}{1 + \frac{y^2}{x^2}} \frac{x\frac{\partial y}{\partial \theta} - y\frac{\partial x}{\partial \theta}}{x^2} =$$

$$\frac{x\frac{\partial y}{\partial \theta} - y\frac{\partial x}{\partial \theta}}{x^2 + y^2}$$

by eliminating common terms. Substituting the terms in the IRF for x, y, and z as given in equations (1a–1c), $$\frac{\partial \alpha}{\partial \theta} = \frac{\cos\alpha\sin\epsilon \frac{\partial y}{\partial \theta} - \sin\alpha\sin\epsilon \frac{\partial x}{\partial \theta}}{\cos^2\alpha \sin^2\epsilon + \sin^2\alpha \sin^2\epsilon}.$$

Eliminating common terms, using the Pythagorean identity, and restoring the subscripts, $$\frac{\partial \alpha_{irf}}{\partial \theta} = \frac{\cos\alpha_{irf} \frac{\partial y_{irf}}{\partial \theta} - \sin\alpha_{irf} \frac{\partial x_{irf}}{\partial \theta}}{\sin\epsilon_{irf}}. \quad (4)$$

Similarly, $$\frac{\partial \epsilon}{\partial \theta} = \frac{\partial \cos^{-1} z}{\partial \theta} = \frac{-1}{\sqrt{1 - z^2}} \frac{\partial z}{\partial \theta} = \frac{-1}{\sqrt{1 - \cos^2\epsilon}} \frac{\partial z}{\partial \theta}.$$

Therefore, (5)

$$\frac{\partial \epsilon_{irf}}{\partial \theta} = \frac{-1}{\sin \epsilon_{irf}} \frac{\partial z_{irf}}{\partial \theta}. \quad (5)$$

The above equations provide expressions for the IRF azimuth and elevation changes for small changes in each of the three state variables, viz., boresight pitch $\theta_y$, boresight roll $\theta_x$, and boresight yaw $\theta_z$. They are, however, functions of the partial derivatives of the x, y, and z components in the IRF and are therefore functions of the same state variables. Expressions for these partial derivatives can be obtained by differentiating the following set of equations expressed in matrix form:

$$\begin{bmatrix} x_{irf} \\ y_{irf} \\ z_{irf} \end{bmatrix} = T_{arf \to irf} \begin{bmatrix} x_{arf} \\ y_{arf} \\ z_{arf} \end{bmatrix}$$

$T_{arf \to irf}$ is derived above and the ARF x, y, and z components are not functions of the state variables. The partial derivative of the above equations with respect to the generalized variable $\theta$ is $$\begin{bmatrix} \frac{\partial x_{irf}}{\partial \theta} \\ \frac{\partial y_{irf}}{\partial \theta} \\ \frac{\partial z_{irf}}{\partial \theta} \end{bmatrix} = \frac{\partial T_{arf \to irf}}{\partial \theta} \begin{bmatrix} x_{arf} \\ y_{arf} \\ z_{arf} \end{bmatrix}. \quad (6)$$

The following three matrices are the partial derivatives with respect to each of the state variables and the following are used with the above equation to produce nine equations:

$$\frac{\partial T_{arf \to irf}}{\partial \theta_y} = \begin{bmatrix} -\psi_y & \psi_x & -1 \\ 0 & 0 & 0 \\ \cos\gamma_z & \sin\gamma_z & -\psi_y\cos\gamma_z + \psi_x\sin\gamma_z \end{bmatrix}, \quad \text{Equations (7)}$$

$$\frac{\partial T_{arf \to irf}}{\partial \theta_x} = \begin{bmatrix} 0 & 0 & 0 \\ \psi_y & -\psi_x & 1 \\ \sin\gamma_z & -\cos\gamma_z & -\psi_y\sin\gamma_z - \psi_x\cos\gamma_z \end{bmatrix},$$

and $$\frac{\partial T_{arf \to irf}}{\partial \theta_z} =$$

$$\begin{bmatrix} -\sin\gamma_z & \cos\gamma_z & \psi_y\sin\gamma_z + \psi_x\cos\gamma_z \\ -\cos\gamma_z & -\sin\gamma_z & \psi_y\cos\gamma_z - \psi_x\sin\gamma_z \\ -\theta_y\sin\gamma_z + \theta_x\cos\gamma_z & \theta_y\cos\gamma_z + \theta_x\sin\gamma_z & \theta_y(\psi_y\sin\gamma_z + \psi_x\cos\gamma_z) \\ & & -\theta_x(\psi_y\cos\gamma_z - \psi_x\sin\gamma_z) \end{bmatrix}.$$

Using the above equations, the H matrix can be derived as follows. For each measurement, the nine partial derivatives for $x_{irf}$, $y_{irf}$, and $z_{irf}$ with respect to the boresight state variables using the above three equations are substituted into equation (6). Those results are substituted into the six equations represented by equations (4) and (5).

The implementation details are now set forth to summarize the complete implementation.

Boresight Filter

The boresight filter uses a standard modified Kalman filter with a nonlinear measurement model. The filter algorithm is set forth below to facilitate a practical implementation and to illustrate the entire process of producing a boresight state vector.

Fixed IR sources (targets) are used to determine the boresight state vector and can be stars primarily but also stable ground earth sources with a known location. The ephemeris for star sources are stored in ECF fixed coordinates for every thirty-second interval, for example. Every thirty seconds the ECF star coordinates and ground coordinates are transformed to ARF coordinates using the above transformation equations. These require knowledge of the satellite location, i.e., the ECF radius vector, also stored in an ephemeris. Only those stars and ground sources that would be in the sensor field of view every thirty seconds need be stored. Sensor observations are made in the vicinity (±500 $\mu$rad) of the predicted ARF location of the source. The collected observations are processed by a Representative Return Formation (RRF) procedure once per scan time of the sensor, i.e., one complete rotation of the satellite.

The Representative Return Formation

The RRF eliminates noisy returns and measures filter performance. The representative return is not filtered itself. Instead, each raw return comprising the representative return is processed through the filter with measurement noise based on each return's intensity as compared to the brightest (primary) return.

The following steps are followed to process data from each scan:

1. Sort by source collection identifier (ID) for each collection ID for each star or ground source in decreasing ARF elevation order;
2. Beginning with the brightest intensity return for an ID, accumulate all returns until a specified gap between adjacent returns is exceeded or there is an increase in intensity;
3(a). If at least one adjacent return for the primary return is found, then the process is finished.
3(b). Otherwise, tag the primary return as unavailable and repeat step 2 using the next brightest intensity return available.
4. If a representative return is found, compute the representative weighted average of azimuth and elevation as follows:

$$\alpha_{irf,rep} = \frac{\sum_{i=1}^{n} \alpha_{irf,i}}{n},$$

and $$\epsilon_{irf,rep} = \frac{\sum_{i=1}^{n} M_i \epsilon_{irf,i}}{\sum_{i=1}^{n} M_i}$$

where n=total number of raw returns used in the RRF, and $M_i$=intensity of the i-th raw return; and 5. Apply the error (difference) data to the boresight Kalman filter in the time order received.

The location of each representative return $\alpha_{irf,rep}$ (the average of the returns) and $\epsilon_{irf,rep}$ (a weighted average) is compared to a predicted source (target) location to determine the error statistics in step 5 above.

The Kalman filter processes the error statistics (in IRF coordinates) according to the following steps:

1. Compute $\Delta t_k = t_k - t_{k-1}$, the elapsed time since the previous filter update in seconds (the initial interval is $\Delta t = 0$);

2. Propagate the state vector from the last update to the present time as $x_k=\Phi x_{k-1}$ which, since $\Phi(t)=I$, leaves the state vector unchanged after propagation, i.e., the state vector is propagated from its value at time $t_n$ to time $t_{n+1}$ by multiplying it by the transition matrix; (This step is trivial but included for completeness since it is necessary when estimation is improved by including velocity states as described below where $\Phi(t) \neq I$.)

3. Transform the ARF location to a unit vector using equations (2a–c);

4. Compute the measurement residual as the difference between the measured and predicted location in the IRF as $$[r_k]=[z_k]-[h_k(x_k)]$$

where $[h_k(x_k)]$ is found from equations (3a–c). These equations must use the propagated boresight state vector and the current best estimate of the attitude state vector in $T_{arf \rightarrow irf}$ and the full form should be used instead of the small angle approximation;

5. Compute the observation matrix $H_k$ using equations (4), (5), (6), and (7). These equations must use the propagated boresight state vector and the current best estimate of the attitude state vector;

6. Propagate the covariance matrix using (all uppercase letters are matrices)

$P_k=\Phi P_{k-1}\Phi^T+Q_{k-1}$ and since $Q(t)_{t=0}$ grows with the square of time, $$Q_{k-1} = Q \times \frac{(\Delta t_k)^2}{2} \;;$$

7. Compute the Kalman gain $K_k$ using $K_k=P_k H_k^T [H_k P_k H_k^T+R_k]^{-1}$ where all upper case letters represent matrices;

8. Update the estimate of the boresight state using the Kalman gain and residual as $x_k=x_k+K_k r_k$, i.e., updating is performed by applying the probability measures to correct the state using the residuals;

9. Update the covariance matrix using the Kalman gain and the observation matrix using $P_k=[I-K_k H_k]P_k$.

The state vector output from step 7 is the filtered boresight state vector and is used to correct the mission-related returns from the sensors which are transformed to the ARF for mission data correction and then to the ECF for earth location and direction. The filter optimizes the accuracy of the result.

Figure 6:
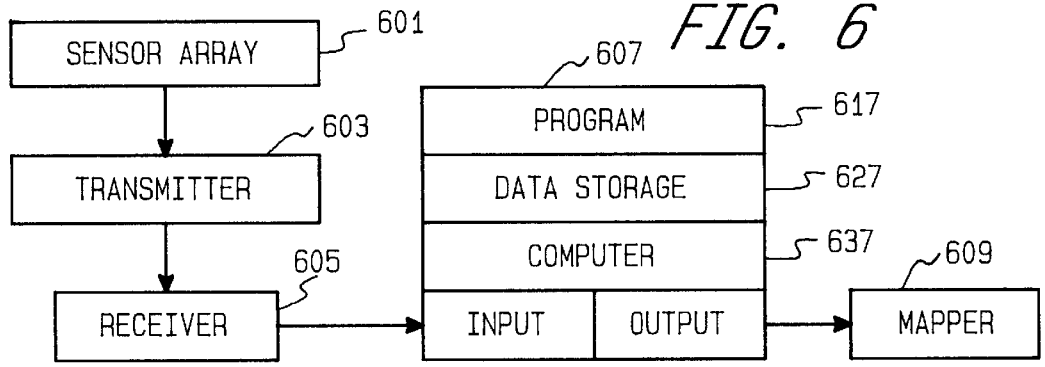
FIG. 6 is a block diagram of a system for practicing the invention.

The block diagram of FIG. 6 show a system embodying the invention. A data processor 607 includes a computer section 637, a data storage 627, an input section 647, and an output section 657. The processing is executed by a computer 637 controlled by a stored program 617.

A sensor array 601 is located in a survey satellite with a transmitter 603. The scanner data is downloaded from the transmitter 603 to a receiver 605 which couples the scanning data signals to the input section 647 and the data is stored in the data storage section 627 from where it is retrieved for processing.

The raw data from the survey satellite is processed for corrections as described in the preceding explanations and, via the output section 657, is supplied to a utilization device, shown in FIG. 6 as a mapper. Other utilization devices are available but are not material to the present invention and will not be discussed further.

Figure 7:
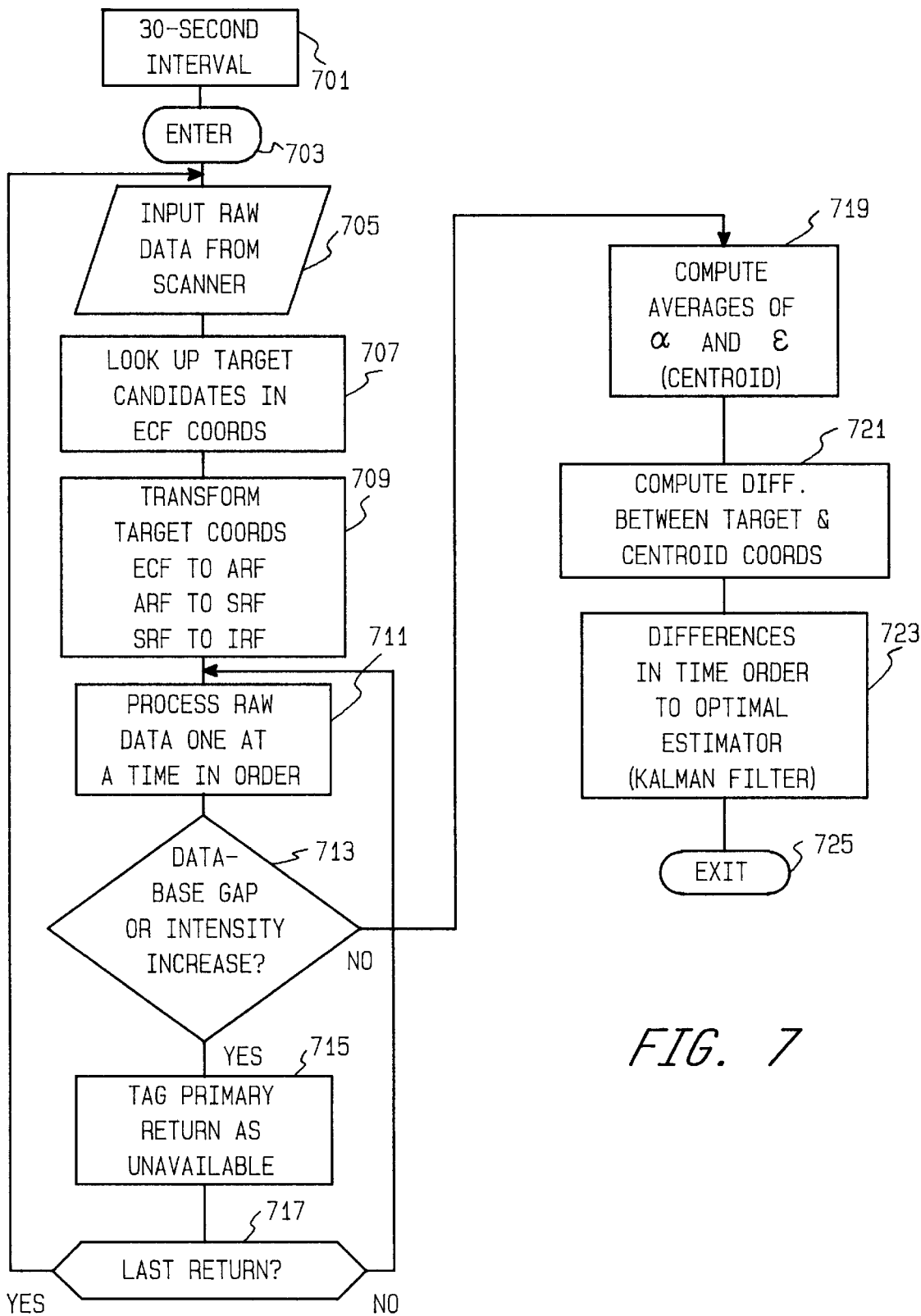
FIG. 7 is a program flowchart of the procedure for processing the input data to calculate the boresight correction state vector.

A flow chart for the program 617 is shown in FIG. 7.

In the following description, references are made to the flowcharts depicting the sequence of operations performed by the program. The symbols used are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets but persons of ordinary skill in the art are familiar with the instruction sets with which they work and can implement the operations set forth in the blocks of the flowchart.

In FIG. 7, the boresight filter program that controls the data processor 607 of FIG. 6 is detailed in a flowchart. It is depicted as a subroutine that is typically called at 30-second intervals and is invoked by a hardware or software timer 701 via the enter terminal 703.

The raw data from the scanner or sensor array 601 of FIG. 6 is stored via the transmitter 603 and receiver 605 and the input section 647 of the data processor of FIG. 6 as shown in an input block 705 of FIG. 7.

Next, the coordinates of the known image, i.e., the target, candidates (those targets within the sensible area of the sensor array) are retrieved in ECF according to a process block 707. The ECF coordinates are transformed in a process block 709 to IRF coordinates as explained in detail above.

The raw data returns are processed in a process block 711 in the order received from the sensor array one at a time. A database gap or an increase in intensity is detected in a decision block 713. If either condition is sensed, then the primary return is tagged as being unavailable as shown in a process block 714. If, according to a decision block 717, the raw data return is the last, then the program execution returns to read in more raw data returns from the scanner at the input block 705. Otherwise, the execution returns to process the next return at process block 711.

If the decision block 713 finds neither a database gap nor an intensity increase, the centroid of the raw return is computed in a process block 719 by averaging as described above. A process block 721 computes the difference between the IRF coordinates of the target and centroid of measurement. These differences are processed by a subroutine 723 in the time order received to supply an optimal estimation of the differences. The optimal estimator is embodied as a Kalman Filter. The subroutine 723 is shown in detail in FIG. 8.

At the end, the procedure is exited via a terminal block 725.

The flowchart of an optimal estimator embodied as a Kalman Filter illustrates the sequence of program instructions employed to implement the Kalman Filter. It is shown as a subroutine that is entered at a terminal block 801. The methods of calculation of the various expressions are explained in detail above. In most cases, programs to make the individual process computations are commercially available. Many are readily implemented by computer programmers of ordinary skill in the art.

First, the time interval $\Delta t$ from the last update of the boresight state vector is calculated by a process block 803. The state vector is propagated to the present time from its prior update in a process block 805.

Next, the ARF coordinates of the unit earth vector are computed in a process block 807. In a process block 809, the measurement residual is computed. The $H_k$ matrix is computed in a process block 811 and used to propagate the previous covariance matrix according to a process block 813.

These computations permit the Kalman Gain to be computed by a process block 815 and to update the boresight state vector by a process block 817. The covariance matrix is updated in a process block 819. Then the subroutine is exited via a terminal block 821.

Figure 9:
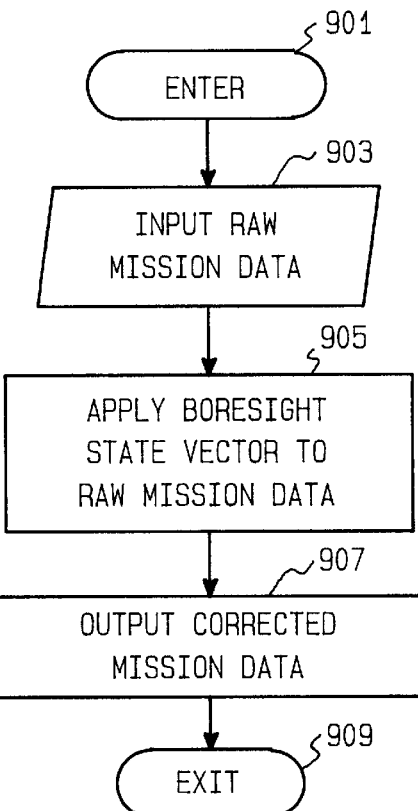
FIG. 9 is a program flowchart for correcting the mission data for boresight errors.

The program flowchart of FIG. 9 illustrates the steps for applying the boresight corrections to the mission data. It is depicted as a subroutine entered at a terminal block 901. The raw mission data is read by an input block 903 similar to the way the target data is read from the scanner (sensor array) as described for the input block 705 in FIG. 7.

Figure 8:
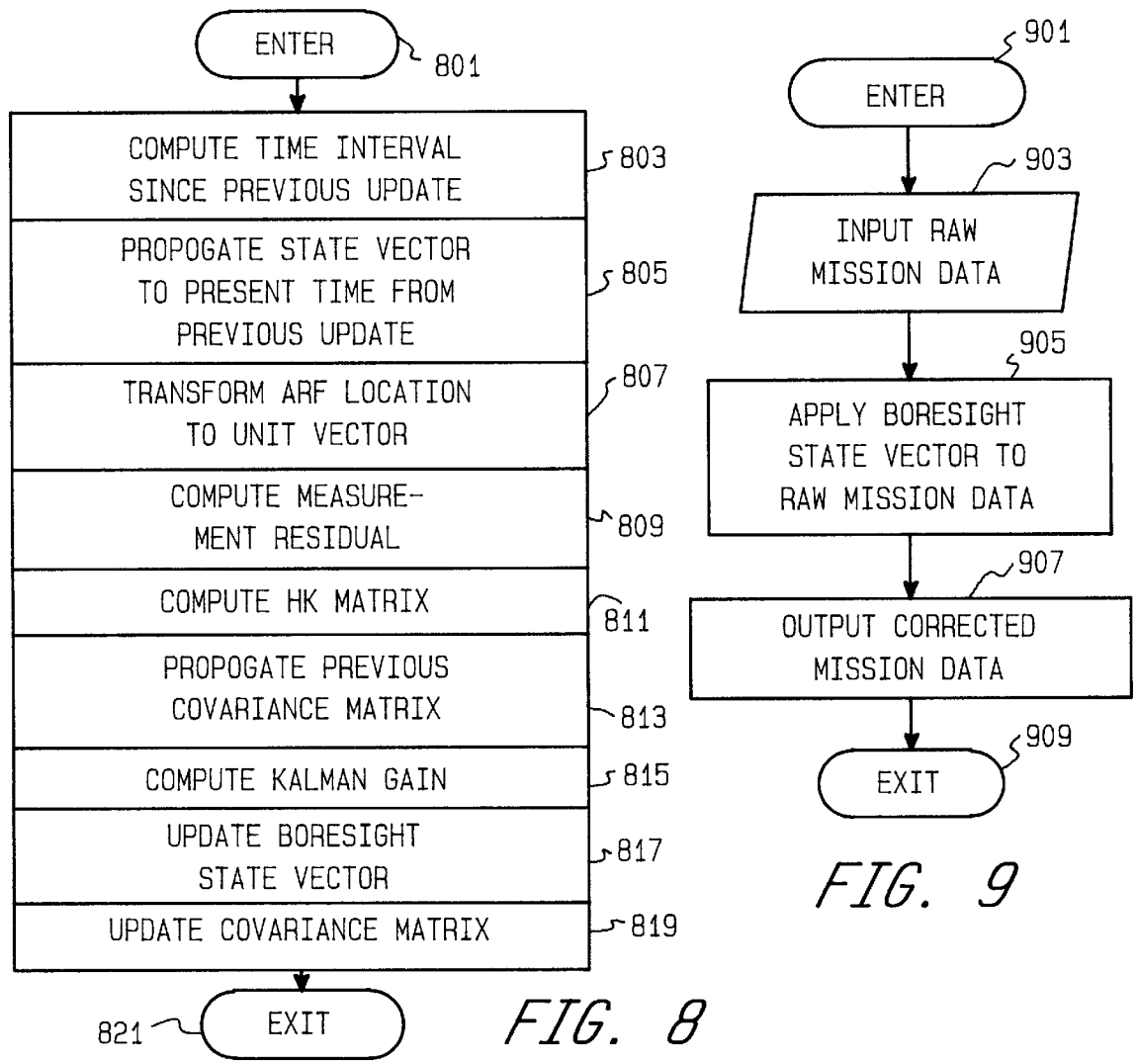
FIG. 8 is a program flowchart of the subroutine incorporating the Kalman Filter implementation of an optimal estimator.

The boresight state vector, updated by the process block 817 of the flowchart of FIG. 8, is applied to the raw mission data according to a process block 905. The corrected mission data is supplied via an output block 907 and the subroutine is exited via a terminal block 909.

Figure 10:
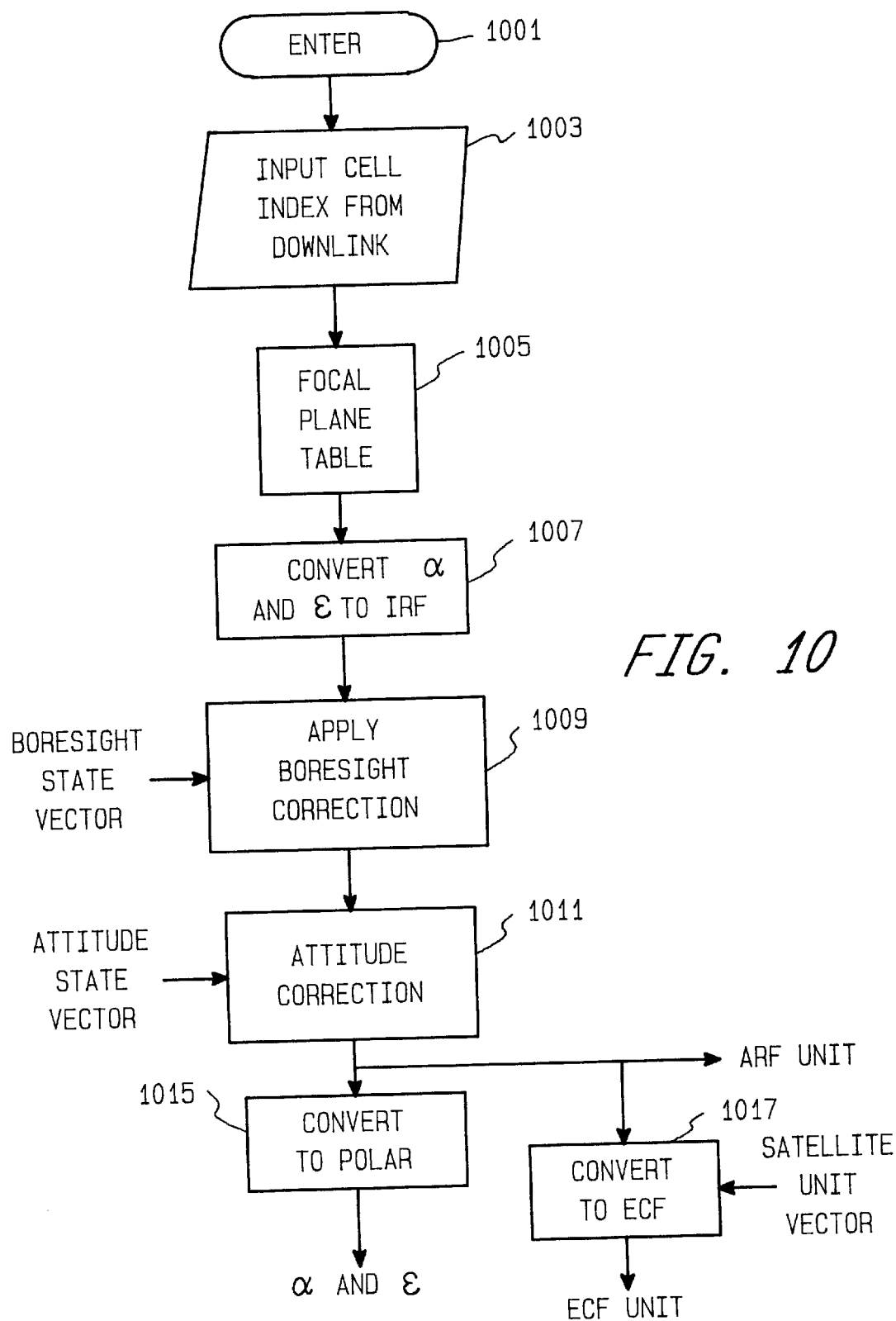
FIG. 10 is a flowchart showing the details of making boresight corrections.

The correction technique is explained in connection with FIG. 10. The equations with their derivation have been set forth above but will be repeated for each step in the following explanation for convenience of reference. The routine is entered via a terminal block 1001 and begins with reading in the index (id) numbers of each sensor in an input/output block 1003. In a process block 1005, the azimuth and elevation of the particular sensor is obtained using, for example, a look-up table technique. The focal plane table is accessed with the individual sensor (cell) index number and the result is a and e of the sensor.

A process block 1007 is supplied with a and e which are converted to IRF coordinates with the equations noted above, viz., $x_{irf} = \cos \alpha \sin \epsilon$, $y_{irf} = \sin \alpha \sin \epsilon$, and $z_{irf} = \cos \epsilon$.

The IRF coordinates are then converted to corrected SRF coordinates in a process block 1009. The inverse transform, $T_{irf \to srf}$ (the boresight state vector), is multiplied times the IRF coordinates.
This is $$\vec{v}_{srf} = \begin{pmatrix} x_{srf} \\ y_{srf} \\ z_{srf} \end{pmatrix} = \Theta_z^T \Theta_x^T \Theta_y^T \begin{pmatrix} x_{irf} \\ y_{irf} \\ z_{irf} \end{pmatrix}.$$

Next, in a process block 1011, the attitude state vector, $T_{srf \to arf}$, is applied to compute the ARF corrected coordinates by $$\vec{v}_{arf} = \Psi_y^T \Psi_x^T \Psi_z^T \vec{v}_{srf} = \begin{pmatrix} x_{arf} \\ y_{arf} \\ z_{arf} \end{pmatrix}.$$

For those uses of the corrected mission data that need polar coordinates, i.e., corrected $\alpha$ and $\epsilon$, a process block 1015 converts the Cartesian coordinates to polar. As explained above, $$\alpha_{arf} = \tan^{-1} \frac{-x_{arf}}{y_{arf}} \text{ and}$$

$$\epsilon_{arf} = \cos^{-1} z_{arf}.$$

The ECF coordinates of the earth frame unit vector are computed in a process block 1017 using the satellite unit vector and $T_{arf \to ecf}$ ($= T_{ecf \to arf}^T$) viz., $$\vec{v}_{ecf} = \begin{pmatrix} \frac{-b}{r_{xy}} & \frac{ac}{r \times r_{xy}} & \frac{-a}{r} \\ \frac{a}{r_{xy}} & \frac{bc}{r \times r_{xy}} & \frac{-b}{r} \\ 0 & \frac{-(a^2+b^2)}{r \times r_{xy}} & \frac{-c}{r} \end{pmatrix} \vec{v}_{arf} = \begin{pmatrix} x_{ecf} \\ y_{ecf} \\ z_{ecf} \end{pmatrix}.$$

The ECF coordinates can be converted to geodetic latitude and longitude if necessary or desired.

The accuracy of the conversion from the input cell index to the earth centered frame of reference, i.e., the sensor data corrected for boresight errors, is directly related to the accuracy of the focal plane vector (look-up) table, the satellite attitude state vector, and the satellite ephemeris. The invention improves the accuracy of the computed earth frame location corresponding to a given sensor cell index by improving the accuracy of the boresight state vector estimate.

To improve accuracy at the expense of longer computing time, the boresight state vector can be augmented to a six-state version vice the three-state version described above. In addition to the pitch, roll, and yaw state variables, their derivatives (representing velocity in the three directions) can be included. The augmented state vector is $$x(t) = \begin{pmatrix} \theta_y \\ \theta_x \\ \theta_z \\ \dot{\theta}_y \\ \dot{\theta}_x \\ \dot{\theta}_z \end{pmatrix}.$$

The covariance matrix of the Kalman Filter is modified to comport with the six-state boresight state vector. That is, $$E\{xx^T\} = Qx(t - t_0) = \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & q_p & 0 & 0 \\ 0 & 0 & 0 & 0 & q_r & 0 \\ 0 & 0 & 0 & 0 & 0 & q_y \end{pmatrix}.$$

The transition matrix for the augmented boresight state vector is no longer a unit (or identity) matrix. Instead, it is $$\Phi(t) = \begin{pmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{pmatrix}. \text{ As a result, } \theta_u(t_1) = \theta_u(t_1) + \dot{\theta}_u(t_1 - t_0)$$

where u is replaced by y, x, or z for each of the coordinate axes.

Finally, the $H_k$ matrix must be augmented for compatibility. Zeroes are simply added so that $$H_k = \begin{pmatrix} \dfrac{\partial \alpha_{irf}}{\partial \theta_y} & \dfrac{\partial \alpha_{irf}}{\partial \theta_x} & \dfrac{\partial \alpha_{irf}}{\partial \theta_z} & 0 & 0 & 0 \\ \dfrac{\partial \epsilon_{irf}}{\partial \theta_y} & \dfrac{\partial \epsilon_{irf}}{\partial \theta_x} & \dfrac{\partial \epsilon_{irf}}{\partial \theta_z} & 0 & 0 & 0 \end{pmatrix}.$$

Figure 11:
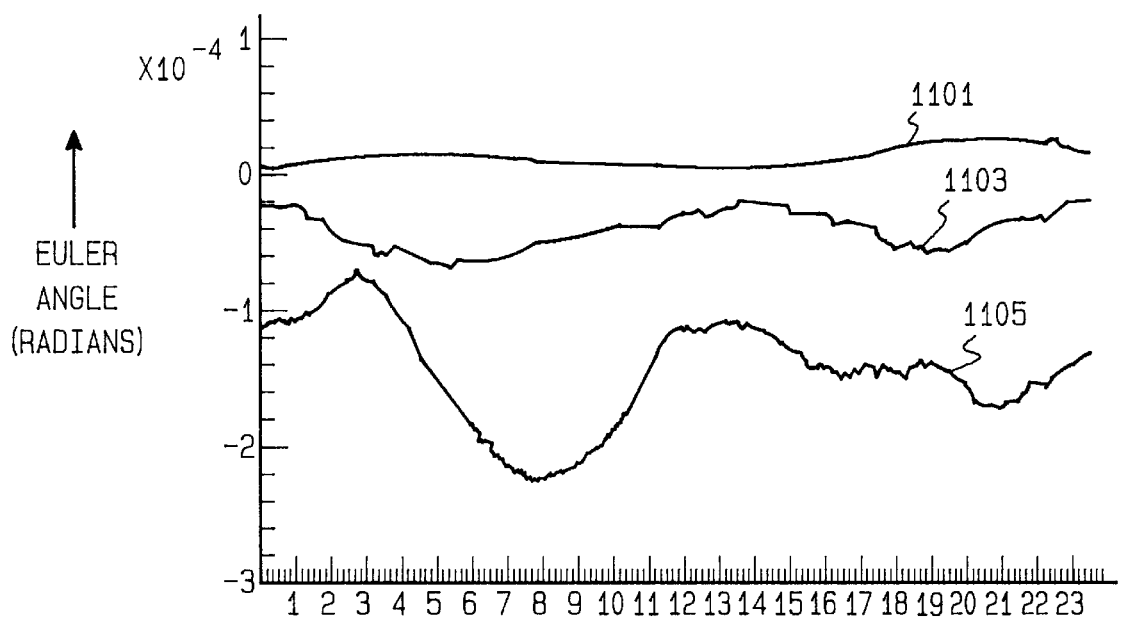
FIG. 11 is a graph of sample data over a twenty-four hour period showing the boresight pitch, roll, and yaw for a three-state implementation of the invention.

The improvement using the augmented matrices in the Kalman Filter is illustrated in FIG. 11 for a sample case over a twenty-four hour period. FIG. ll(A) shows the boresight pitch, roll, and yaw for the three state boresight state vector. FIG. o 11 (B) illustrates the same values for the six-state result. The graph line 1101 is the boresight yaw for the three-state implementation and 1102 is the boresight yaw for the six-state implementation. Similarly, the lines 1103 and 1105 are the boresight roll and pitch values, respectively, for the three-state implementation and the lines 1104 and 1106 are the same values, respectively, for the six-state implementation.

The boresight state vector values are smoother using the augmented matrices and more accurate but at the expense of more computation time.

FIG. 11 is a graph of sample data over a twenty-four hour period showing the boresight pitch, roll, and yaw for a three-state implementation of the invention. The boresight yaw is shown as line 1101, the boresight roll as line 1103, and the boresight pitch as line 1105.

Figure 12:
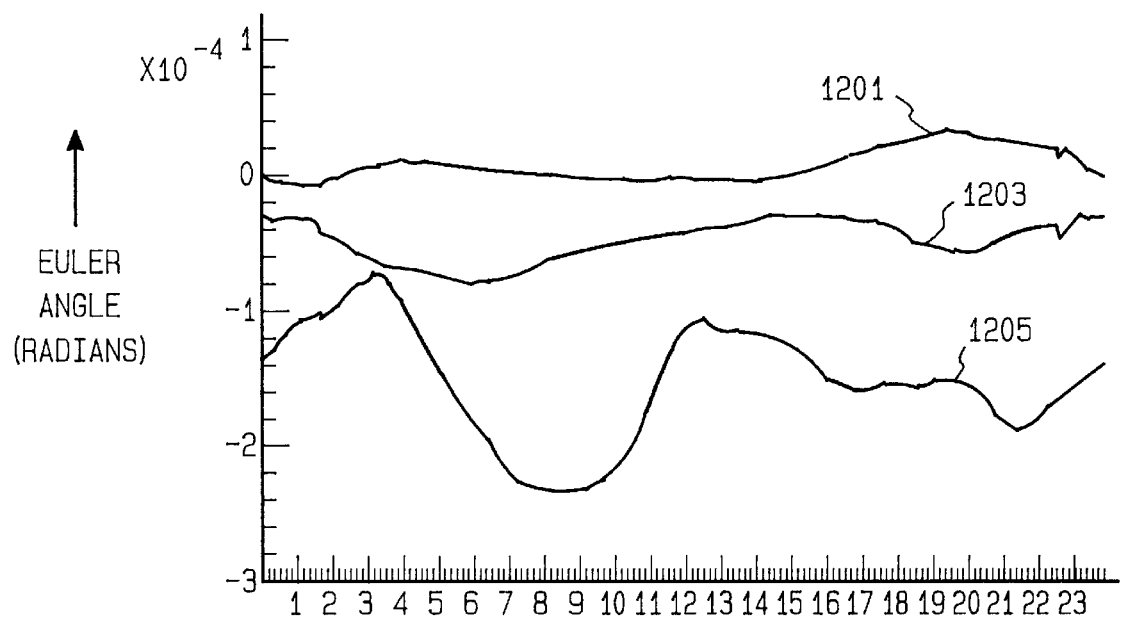
FIG. 12 is a graph of sample data over a twenty-four hour period showing the boresight pitch, roll, and yaw for a six-state implementation of the invention.

FIG. 12 is a graph of the same sample data over a twenty-four hour period showing the boresight pitch, roll, and yaw for a sixstate augmented implementation of the invention. The boresight yaw is shown as line 1201, the boresight roll as line 1203, and the boresight pitch as line 1205. The smoothing due to inclusion of the velocity vector states is readily discernible.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a spacecraft imaging system, a boresight correction system comprising, in combination:

an array of a plurality of sensing elements for producing signals indicative of an imposed image thereon;

means for predicting the position of a known image in terms of given ones of said sensing elements;

means for determining a sensing element receiving the known image imposed on said array;

spacecraft attitude determining means;

means responsive to the predicting means, to the spacecraft attitude determining means, and to the sensing element determining means for supplying error signals representative of the differences between the actual locations and predicted locations of said images on the array; and estimator means for supplying best-estimate correction offsets to be applied to observation data from said array of sensing elements.

2. The combination of claim 1 including:

means responsive to signals from the array of sensing elements for determining representative returns;

means responsive to the representative returns for finding a centroid of measurement; and selection means responsive to centroids of measurement for selecting data returns to be processed.

3. The combination of claim 1 further including:

means responsive to the array of sensing elements and to the estimator means for applying the correction offsets to signals from the array of sensing elements to supply corrected data signals.

4. The combination of claim 3 wherein said predicting means includes:

means for storing ephemeral data of celestial bodies observable by the sensing elements.

5. The combination of claim 4 wherein the ephemeral data is stored in the form of celestial coordinates and said predicting means further includes:

means for converting celestial coordinates of ephemeral data to coordinates in terms of the sensing array frame of reference.

6. The combination of claim 5 wherein said converting means includes:

transformation means for transforming the celestial coordinates via mesne frames of reference including a spacecraft attitude frame of reference.

7. The combination of claim 3 wherein said means for applying said correction offsets is further responsive to data representing spacecraft attitude.

8. The combination of claim 3 wherein said means for selecting a centroid of measurement includes:

averaging means responsive to the signals from the array of sensing elements.

9. The combination of claim 8 including:

means for assigning weights to the signals from the array of sensing elements to supply a weighted average.

10. The combination of claim 3 wherein said estimator means includes Kalman Filter means.

11. A system for correction of errors in spacecraft observation data caused by distortion in a focal plane of sensor elements comprising, in combination:

means for supplying known position coordinates of a sensible object with respect to an earth-centered frame of reference;

means for converting the known position coordinates from the earth-centered frame of reference to coordinates in a sensor frame of reference using intermediate conversions between mesne frames of reference;

means for comparing the observed position coordinates from the sensor elements in the focal plane to the known position coordinates of the sensible object to determine roll, pitch, and yaw errors concurrently; and means for applying said roll, pitch, and yaw errors to satellite observation data to eliminate errors due to distortion of the focal plane.

12. A boresight calibration filter for determining and correcting observation data from an spacecraft, comprising, in combination:

sensor means for providing data indicative of a detected position of an image focused on an array of sensing elements;

computer means; and means for coupling the data provided by said sensor means to said computer means, said computer means being preprogrammed to compute from said data an optimal estimation of errors determined from comparison of predicted image data from a known image with actual image data, said computer means using said determined errors to correct image data from an unknown image, thereby correcting observation data for boresight errors.

13. A computer-implemented system for correcting boresight errors comprising, in combination:

sensing means for supplying observation data signals representing position parameters of images imposed on an array of sensing means in a first frame of reference;

computer means for executing sequences of instructions to process observation data signals from said sensing means;

output means in said computer means for supplying processed data;

input means in said computer means for receiving observation data signals to be processed;

coupling means for coupling said observation data signals from said sensing means to said input means;

retrieval means for supplying data signals representing position parameters of known images in a second frame of reference;

programming means including sequences of instructions for controlling said computer means to transform position parameters from the second frame of reference to the first frame of reference, to compute difference values of transformed position parameters of the known images and position parameters from said sensing means representing detected images of known targets, to derive optimized values of said difference values, and to apply the optimized values to position parameters from said sensing means representing unknown images, whereby said supplied data processed from said output means is corrected for boresight errors.

14. The combination of claim 13 wherein said second frame of reference includes a spacecraft frame of reference.

* * * * *